United States Patent
Kuroiwa

(10) Patent No.: US 10,619,883 B2
(45) Date of Patent: Apr. 14, 2020

(54) DETERMINATION ASSISTANCE DEVICE, DETERMINATION ASSISTANCE METHOD, AND PROGRAM

(71) Applicant: Mitsubishi Electric Corporation, Tokyo (JP)

(72) Inventor: Takeru Kuroiwa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 74 days.

(21) Appl. No.: 15/553,226

(22) PCT Filed: Jul. 28, 2015

(86) PCT No.: PCT/JP2015/071394
§ 371 (c)(1),
(2) Date: Aug. 24, 2017

(87) PCT Pub. No.: WO2017/017791
PCT Pub. Date: Feb. 2, 2017

(65) Prior Publication Data
US 2018/0038609 A1    Feb. 8, 2018

(51) Int. Cl.
*F24F 11/30*    (2018.01)
*F24F 11/32*    (2018.01)
(Continued)

(52) U.S. Cl.
CPC ............ *F24F 11/89* (2018.01); *F24F 11/30* (2018.01); *F24F 11/32* (2018.01); *F24F 11/38* (2018.01);
(Continued)

(58) Field of Classification Search
CPC .. F24F 11/30; F24F 11/32; F24F 11/38; F24F 11/49; F24F 11/523; F24F 11/89;
(Continued)

(56) References Cited

U.S. PATENT DOCUMENTS

| | | | |
|---|---|---|---|
| 5,481,481 A | 1/1996 | Frey et al. | |
| 2008/0077019 A1* | 3/2008 | Xiao | A61B 5/01 600/474 |

(Continued)

FOREIGN PATENT DOCUMENTS

| | | | |
|---|---|---|---|
| JP | H05-312381 A | 11/1993 | |
| JP | H06-159757 A | 6/1994 | |

(Continued)

OTHER PUBLICATIONS

Flir, FLIR ONE for Android/iOS (Jul. 15, 2015) (Year: 2015).*

(Continued)

*Primary Examiner* — Edward F Landrum
*Assistant Examiner* — Chang H Park
(74) *Attorney, Agent, or Firm* — Posz Law Group, PLC

(57) ABSTRACT

A determination assistance device includes an infrared image acquirer that acquires an infrared image by imaging an area including an air outlet of an air conditioner, a communicator that communicates with the air conditioner, an inputter that accepts data inputs, imaging switch operations, and the like performed by user, a display that displays image data and the like, a controller that controls overall operations of the determination assistance, and a storage that stores various data, a program, and the like. A display controller of the controller displays on the display the infrared image and whether or not abnormality, determined by the infrared image, is present in the air conditioner.

16 Claims, 8 Drawing Sheets

(51) Int. Cl.
  *F24F 11/38* (2018.01)
  *F24F 11/49* (2018.01)
  *F24F 11/523* (2018.01)
  *F24F 11/89* (2018.01)
  *F24F 110/10* (2018.01)
  *G01J 5/00* (2006.01)

(52) U.S. Cl.
  CPC ............ *F24F 11/49* (2018.01); *F24F 11/523* (2018.01); *G01J 5/0014* (2013.01); *F24F 2110/10* (2018.01); *G01N 2223/401* (2013.01); *G06T 2207/10048* (2013.01)

(58) Field of Classification Search
  CPC ................ F24F 2110/10; G01J 5/0014; G01N 2223/401; G06T 2207/10048
  USPC .......................................................... 62/125
  See application file for complete search history.

(56) References Cited

U.S. PATENT DOCUMENTS

| 2010/0036533 | A1 | 2/2010 | Masuda et al. |
| 2011/0115816 | A1 | 5/2011 | Brackney |
| 2013/0073244 | A1 | 3/2013 | Simons |
| 2013/0245965 | A1 | 9/2013 | Kane et al. |
| 2014/0365017 | A1* | 12/2014 | Hanna ..................... F24F 11/30 700/276 |

FOREIGN PATENT DOCUMENTS

| JP | 2004-020132 A | 1/2004 |
| JP | 2004-102653 A | 4/2004 |
| JP | 2006-177663 A | 7/2006 |
| JP | 2007-078283 A | 3/2007 |
| JP | 2010-133655 A | 6/2010 |
| JP | 2010-230297 A | 10/2010 |
| WO | 2008/087959 A1 | 7/2008 |

OTHER PUBLICATIONS

InfraMation, Infrared HVAC Application (2010) (Year: 2010).*
Sun et al., An Examination of the Influence of Various Effects on Room Air Flow (2002) (Year: 2002).*
Int-Hout III, Best Practices for Selecting Diffusers (2004), ASHRAE Journal (Year: 2004).*
Price, Engineering Guide Air Distribution (2011) (Year: 2011).*
Aswegan et al., Designing for Comfort & IAQ: Air distribution per ASHRAE 55 and 62.1 (2014), the construction specifier (Year: 2014).*
Cehlin, Visualization of Airflow, Temperature and Concentration Indoors (2006), University of Gävle (Year: 2006).*
Titus, ASHRAE—Chicago, Air Distribution Selection Basics (2010) (Year: 2010).*
Zz3astro, "Flir One video of switches, lights, HVAC and cats", YouTube, 6:38-6:43, Dec. 21, 2014, https://www.youtube.com/watch?v=iEGeTDDkLI8 (Year: 2014).*
FLIR Systems, Inc., "Building Applications", YouTube, 0:39-0:43, Oct. 19, 2010, https://www.youtube.com/watch?v=0vWP1owBuXo (Year: 2010).*
Office Action dated Feb. 6, 2018 issued in corresponding JP patent application No. 2017-530523 (and English translation).
International Search Report of the International Searching Authority dated Oct. 20, 2015 for the corresponding international application No. PCT/JP2015/071394 (and English translation).
Extended EP Search Report dated Feb. 13, 2019 issued in corresponding EP application No. 15899624.9.
Office action dated Jul. 22, 2019 issued in corresponding CN patent application No. 201580080017.5 (and English translation thereof).

* cited by examiner

DETERMINATION ASSISTANCE DEVICE, DETERMINATION ASSISTANCE METHOD, AND PROGRAM

CROSS REFERENCE TO RELATED APPLICATION

This application is a U.S. national stage application of International Patent Application No. PCT/JP2015/071394 filed on Jul. 28, 2015, the disclosure of which is incorporated herein by reference.

TECHNICAL FIELD

The present disclosure is related to a determination assistance device, a determination assistance method, and a program.

BACKGROUND ART

In maintenance work for verifying that no abnormality is present in an air conditioner, a worker confirms the operating state such as heating, cooling, and air-circulating typically by holding a tester equipped with a temperature sensor up to the front of air outlet of an indoor unit to measure a temperature or by his or her own bodily sensation.

Nowadays, techniques for air-conditioning control using a mobile terminal and an air-conditioning equipment management device that link together have been proposed. For example, Patent Literature 1 discloses an air-conditioning equipment control device that performs operational control of air-conditioning equipment in accordance with temperature conditions in vicinity of a person actually in a room by transmission of data measured with a built-in temperature sensor of a mobile device to an air-conditioning equipment management device.

CITATION LIST

Patent Literature

Patent Literature 1: Unexamined Japanese Patent Application Kokai Publication No. 2004-020132

SUMMARY OF INVENTION

Technical Problem

The aforementioned maintenance work involving use of the tester is susceptible to errors in the temperature measurement due to, for example, the way in which air from the indoor unit comes in contact with the sensor. Moreover, since the only determination criteria is the temperature measured in close proximity to the sensor, abnormalities involving airflow volume, airflow direction, or the like could not be confirmed. Since determinations based on the bodily sensation of the worker cannot be quantitatively measured, the margin for error is great due to discrepancies in determinations made among the workers.

The air-conditioning control in Patent Literature 1 is a temperature control performed to make the person holding the mobile device feel comfortable. Thus, this air-conditioning control could not be used during maintenance work of the air conditioner to confirm whether or not abnormality is present in the air conditioner.

The temperature sensor typically is a contact-type temperature sensor or a non-contact-type temperature sensor. In Patent Literature 1, the type of built-in temperature sensor of the mobile device is not specifically disclosed. However, since the temperature sensor is used for local temperature measurements in vicinity of the person holding the mobile device, the temperature sensor conceivably is the contact-type temperature sensor such having a small measurement area, such as a thermistor or a thermocouple.

The mobile devices equipped with such contact-type temperature sensors can only perform local temperature measurements and thus cannot be used during maintenance work to confirm whether or not abnormality of a cooling, heating, air-blowing and/or the like (temperature control, airflow volume, airflow direction, and/or the like) is present in the air conditioner. Also, mobile terminals or the like such as typical smartphones are not always equipped with a temperature sensor. Therefore, such mobile devices are limited to mobile terminals of special design, meaning the design restrictions are great.

In order to solve the aforementioned problem, an objective of the present disclosure is to provide a determination assistance device and the like, with smaller design restrictions, that can assist in accurately determining whether or not abnormality is present in an air conditioner.

Solution to Problem

In order to achieve the aforementioned objective, a determination assistance device of the present disclosure includes:

infrared image acquiring means for acquiring an infrared image by imaging an area including an air outlet of an air conditioner; and display controlling means for causing a display device to display the infrared image and whether or not abnormality is present in the air conditioner, determined based on the infrared image.

Advantageous Effects of Invention

As the present disclosure is also applicable to a mobile terminal or the like provided with a typical imaging function, the present disclosure makes design restrictions smaller. The present disclosure also enables assistance in accurately determining whether or not abnormality is present in the air conditioner. This is because the infrared image (temperature distribution) of the vicinity of an air outlet of the air conditioner is used for the assistance in the determination as to whether or not abnormality is present.

DESCRIPTION OF EMBODIMENTS

Embodiment 1

A determination assistance device 100 according to Embodiment 1 of the present disclosure is described below in detail with reference to the drawings.

The determination assistance device 100 is, for example, a compact terminal device (smartphone) portable for a user (maintenance worker) and provided with communication functionality. Here, the determination assistance device 100 is used for determining whether or not abnormality is present in an air conditioner 10. Next, a configuration of the determination assistance device 100 is described.

Figure 1:
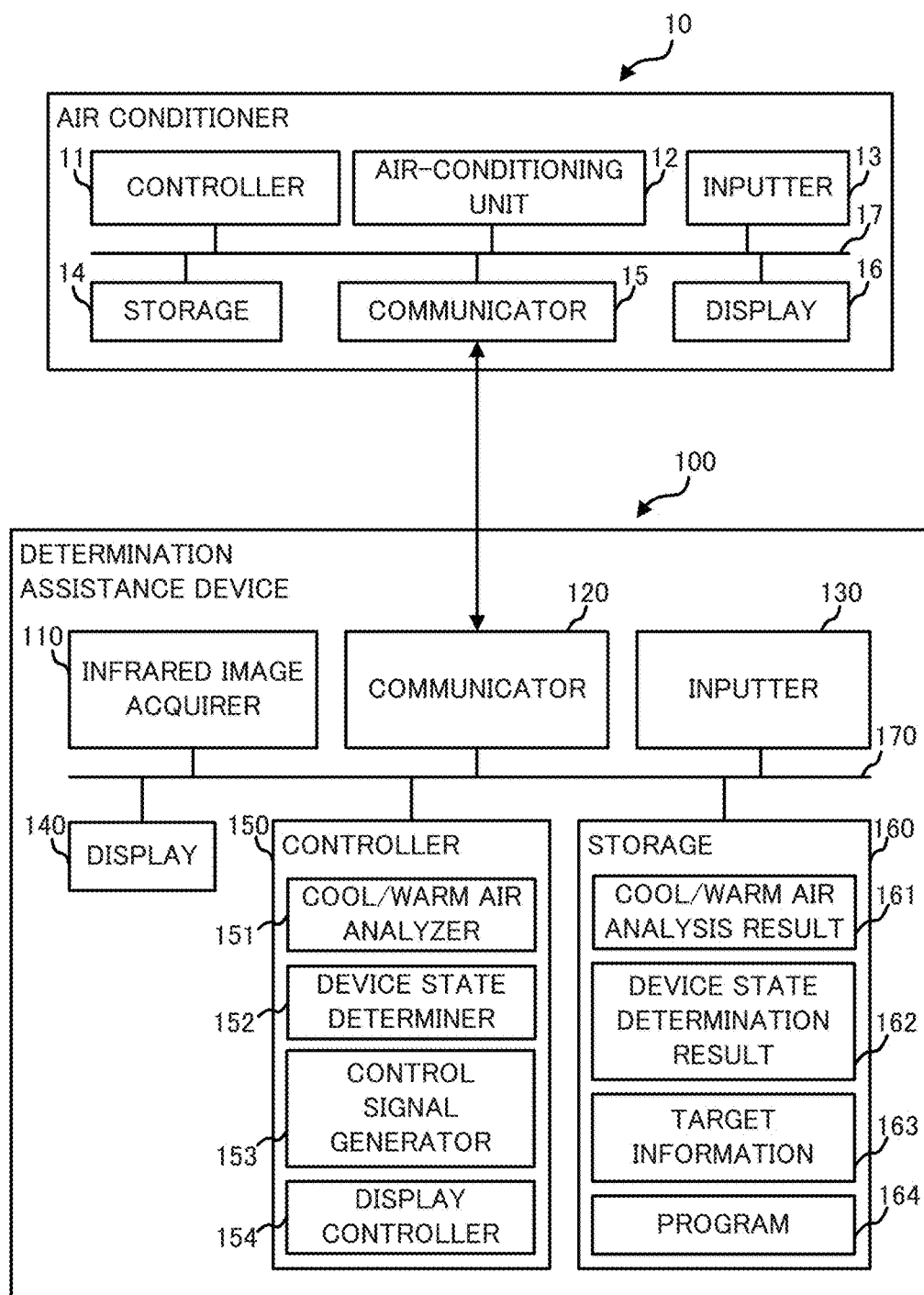
FIG. 1 is a function block diagram illustrating a determination assistance device and an air conditioner according to Embodiment 1.

The determination assistance device 100, as illustrated in FIG. 1, includes an infrared image acquirer 110 that acquires an infrared image, a communicator 120 that communicates with the air conditioner 10, an inputter 130 that accepts data inputs, imaging switch operations, and the like from the user, a display 140 that displays image data and the like, a controller 150 that controls overall operations of the determination assistance 100, and a storage 160 that stores various data, a program, and the like. The components are mutually connected via a bus 170.

The infrared image acquirer 110 includes an infrared image sensor formed of, for example, a charge coupled device (CCD), complementary metal oxide semiconductor (CMOS), or the like. The infrared image acquirer 110 images an area including the air outlet of the air conditioner 10 that is the determination subject, and acquires an infrared image of a two-dimensional coordinate space based on a distribution of an amount of infrared radiation emitted from the area.

Note that the user performs the imaging operations such as the pointing the infrared image acquirer 110 at the area that includes the air outlet of the air conditioner 10, the pressing the imaging switch, and the like. The infrared image acquirer 110 functions as infrared image acquisition means.

The communicator 120 includes, for example, a communication antenna, a radio frequency (RF) circuit, a baseband (BB) circuit, and/or the like. The communicator 120 communicates with another device (the air conditioner 10, for example) via a wireless local area network (LAN). The communicator 120 functions as communication means.

The inputter 130 may be, for example, a keyboard, a mouse, an imaging switch, and/or a touch panel. The inputter 130 accepts data inputs and various operations performed by the user.

The display 140, may be, for example, a liquid crystal display (LCD), an electroluminescence (EL) display, or the like. The display 140 displays an image in accordance with the inputted image data.

The controller 150 includes a processor, which may include a central processing unit (CPU), a read only memory (ROM), and/or a random access memory (RAM). The controller 150 controls the overall operations of the determination assistance device 100.

The storage 160 includes, for example, a hard disk drive, a readable/writable non-volatile semiconductor memory such as flash memory, and the like. The storage 160, for example, stores various kinds of data including a cool/warm air analysis result 161, a device state determination result 162, target information 163, and the like and stores a program 164 and the like for controlling the operation state of each component of the determination assistance device 100.

Next, the function configuration of the controller 150 is described in detail. The controller 150 includes a cool/warm air analyzer 151 that analyzes cool/warm air, a device state determiner 152 that determines whether or not abnormality is present in the air conditioner 10, a control signal generator 153 that generates a control signal for operating the air conditioner 10, and a display controller 154 that performs control to cause the display 140 to display the various images. The functions of these components are realized by the controller 150 executing the program 164 stored in the storage 160. The device state determiner 152 functions as device state determination means. The display controller 154 functions as display controlling means.

The cool/warm air analyzer 151 derives temperature, airflow strength, and airflow direction of the cool/warm air from the infrared image acquired by the infrared image acquirer 110. For example, suppose that the infrared image of the two-dimensional coordinate space acquired by the infrared image acquirer 110 during a cooling operation of the air conditioner 10 is the image that is illustrated in FIG. 2.

Figure 2:
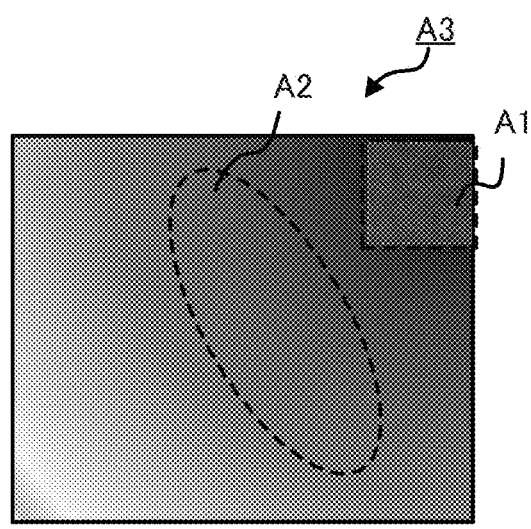
FIG. 2 is a diagram illustrating an example of an infrared image that is displayed.

The infrared image in FIG. 2 depicts the infrared intensity distribution (that is, the temperature distribution) as a monochrome image using density, wherein the denser area depicts the area having a lower temperature. As such, in FIG. 2, the temperature is the lowest in the upper-right corner of the figure and gets higher the closer to the lower-left corner.

In this case, the cool/warm air analyzer 151 recognizes dotted-line area A1 as the air outlet of an air-conditioning unit 12 of the air conditioner 10. The dotted-line area A1 has the lowest temperature within area A3 including the air outlet of the air conditioner 10 that is the determination subject. After the recognition, the cool/warm air analyzer 151 detects the temperature of area A1 as the air-conditioning cool-air temperature, and detects the air-conditioning airflow strength and airflow direction by analyzing area A2 where the temperature changes from area A1 to the lower left.

For example, if the temperature gradient in area A2 extends far to the lower left of the figure, then the airflow strength is determined as high. Here, the airflow strength is recognized as "Low" for a 0 to 1 m/s airflow velocity, as "Medium" for a 1 to 3 m/s airflow velocity, and "High" for a 3 to 5 m/s airflow velocity. Note that the determination criteria for airflow strength and airflow direction, which is described below, are set in the storage 160 of the determination assistance device 100 beforehand by a manufacturer or a user, and the cool/warm air analyzer 151 identifies the airflow strength and the airflow direction based on these criteria.

Here, if the temperature gradient in area A2 extends leftward in the figure in a range of 30 degrees downward and upward from the horizontal direction, the airflow direction is identified as being "Upwards". If the temperature gradient in area A2 extends in a direction in a range between 30 degrees and 60 degrees downward from the horizontal direction, the airflow direction is determined as being "Frontal Direction", whereas if the temperature gradient extends in a direction in a range that is greater than or equal to 60 degrees from the horizontal direction, the airflow direction is determined as being "Downwards". Note that when the air conditioner 10 is in the air-blowing operation instead of the cooling operation, the cool/warm air analyzer 151 detects the airflow strength and the airflow direction with the assumption that the temperature gradient is mild.

The device state determiner 152 compares the temperature, the airflow strength, and the airflow direction of the cool/warm air derived by the cool/warm air analyzer 151 against the target temperature, the target airflow strength, and the target airflow direction provided in the target information 163 stored in the storage 160, thereby deriving deviations between those of the cool/warm air analyzer 152 and the storage 160. The device state determiner 152 determines whether or not abnormality is present in the air conditioner 10 based on the derived deviations. Furthermore, when abnormality is determined to be present, abnormality types are determined in accordance with parameters (temperature, airflow strength, and airflow direction) that have abnormality.

A determination is made as to whether or not abnormality is present in the operation state based on whether the differences (deviations) between the cool/warm air analysis result 161 and the target information 163 falls within an allowable range. Here, the allowable range is based on the following: the deviation between the target temperature and the measured temperature, that is, the temperature difference, is within 1 degree Celsius; there is no difference between the target airflow strength and the measured airflow strength (that is, both are either "High", "Medium", or "Low"); and there is no difference between the target airflow direction and the measured airflow direction (that is, both are either "Upwards", "Frontal Direction", or "Downwards".

Figure 3:
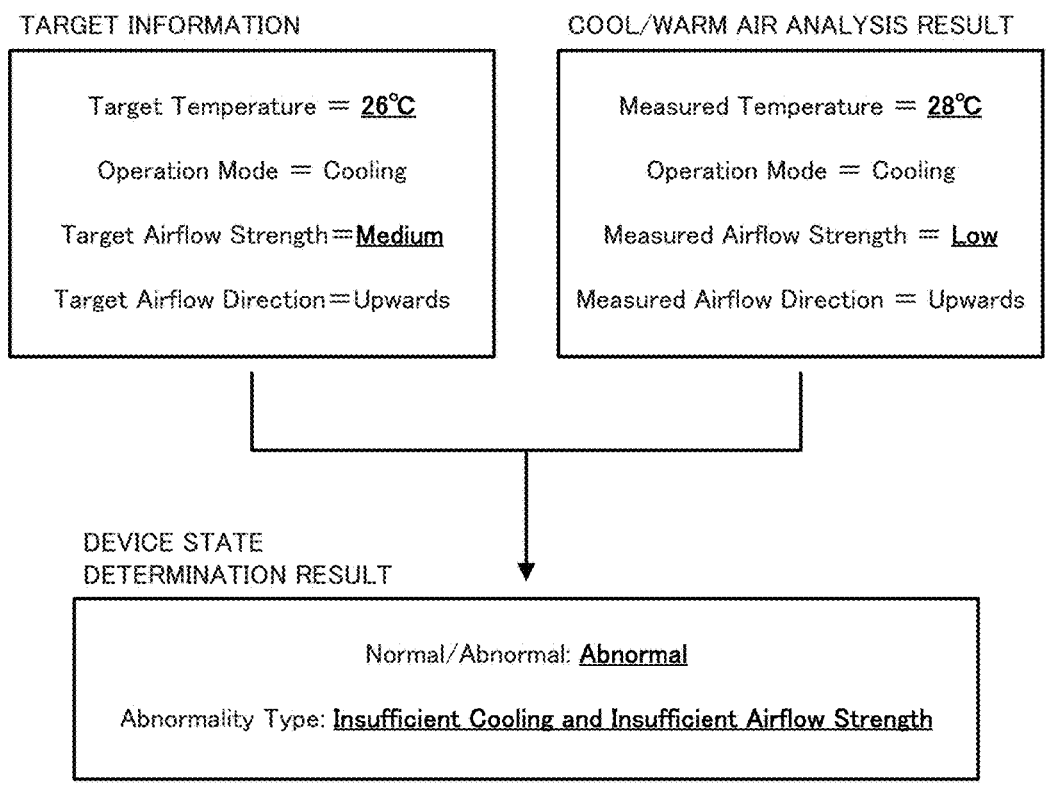
FIG. 3 is a diagram illustrating an example of target information, a cold/warm air analysis result and a device state determination result.

For example, as illustrated in FIG. 3, the target information is "the target temperature is 26 degrees Celsius, the operation mode is cooling, the target airflow strength is medium, and the target airflow direction is upwards", whereas the cool/warm air analysis result is "the measured temperature is 28 degrees Celsius, the operation mode is cooling, the measured airflow strength is low, and the measured airflow direction is upwards". In such a case, the difference between the target information and the cool/warm air analysis result is outside the allowable range because the measured temperature is two degrees Celsius higher than the target temperature even though the cooling operation is underway and the measured airflow strength is "low" even though the target airflow strength is "medium".

Consequently, the operation state of the air conditioner 10 is determined to be "Abnormal" as the device state determination result. Moreover, the abnormality type is determined to be "Insufficient Cooling and Insufficient Airflow Strength". Note that the cool/warm air analysis result of the cool/warm air analyzer 151 is stored as the cool/warm air analysis result 161 in the storage 160, whereas the device state determination result of the device state determiner 152 is stored as the device state determination result 162 in the storage 160.

The control signal generator 153 generates a control signal based on the target information 163 containing the set temperature, cooling operation, and the like that are inputted in the inputter 130 by the user. The control signal, which contains the target information 163, is for controlling the air conditioner 10. The display controller 154 displays on the display 140 the infrared image (FIG. 2, for example) or an image (FIG. 3, for example) containing the cool/warm air analysis result 161, the device state determination result 162, the target information 163, or the like stored in the storage 160.

Next, a configuration of the air conditioner 10, which is the maintenance subject, is described. The air conditioner 10 is, more particularly, an air-conditioning indoor unit, and is connected to an air-conditioning outdoor unit not illustrated in the drawings. The air conditioner 10 includes a controller 11 that controls the overall operations of the air conditioner 10, an air-conditioning unit 12 that performs air conditioning, an inputter 13 that accepts user operations, a storage 14 that stores a program necessary for control, setting information, and the like, a communicator 15 that communicates with another device and the like, and a display 16 that displays image data and the like. The components are mutually connected via a bus 17.

The controller 11 includes a processor, which may include a central processing unit (CPU), a read only memory (ROM), and/or a random access memory (RAM). The controller 11 controls the overall operations of the air conditioner 10.

The air-conditioning unit 12 includes, for example, a heat exchanger, a fan for blowing conditioned air from the air outlet to an indoor space, and a flap for controlling the airflow direction. The air-conditioning unit 12 exchanges heat between outside air and air in the indoor space by circulating refrigerant between the air-conditioning outdoor unit and the air-conditioning indoor unit.

The inputter 13 may be, for example, a keyboard, a touch panel, and/or an operation button. The inputter 13 accepts data inputs and various operations performed by the user.

The storage 14 includes a hard disk drive, a readable/writable non-volatile semiconductor memory such as flash memory, and the like. The storage 14 stores a program that is necessary for controlling the air conditioner 10, setting information set by the user, and the like.

The communicator 15 includes, for example, a communication antenna, a radio frequency (RF) circuit, a baseband (BB) circuit, and/or the like. The communicator 15 communicates with another device (the determination assistance device 100, for example), via a wireless local area network (LAN).

The display 16, may be, for example, a liquid crystal display (LCD), an electroluminescence (EL) display, or the like. The display 16 displays an image in accordance with the inputted image data.

Figure 4:
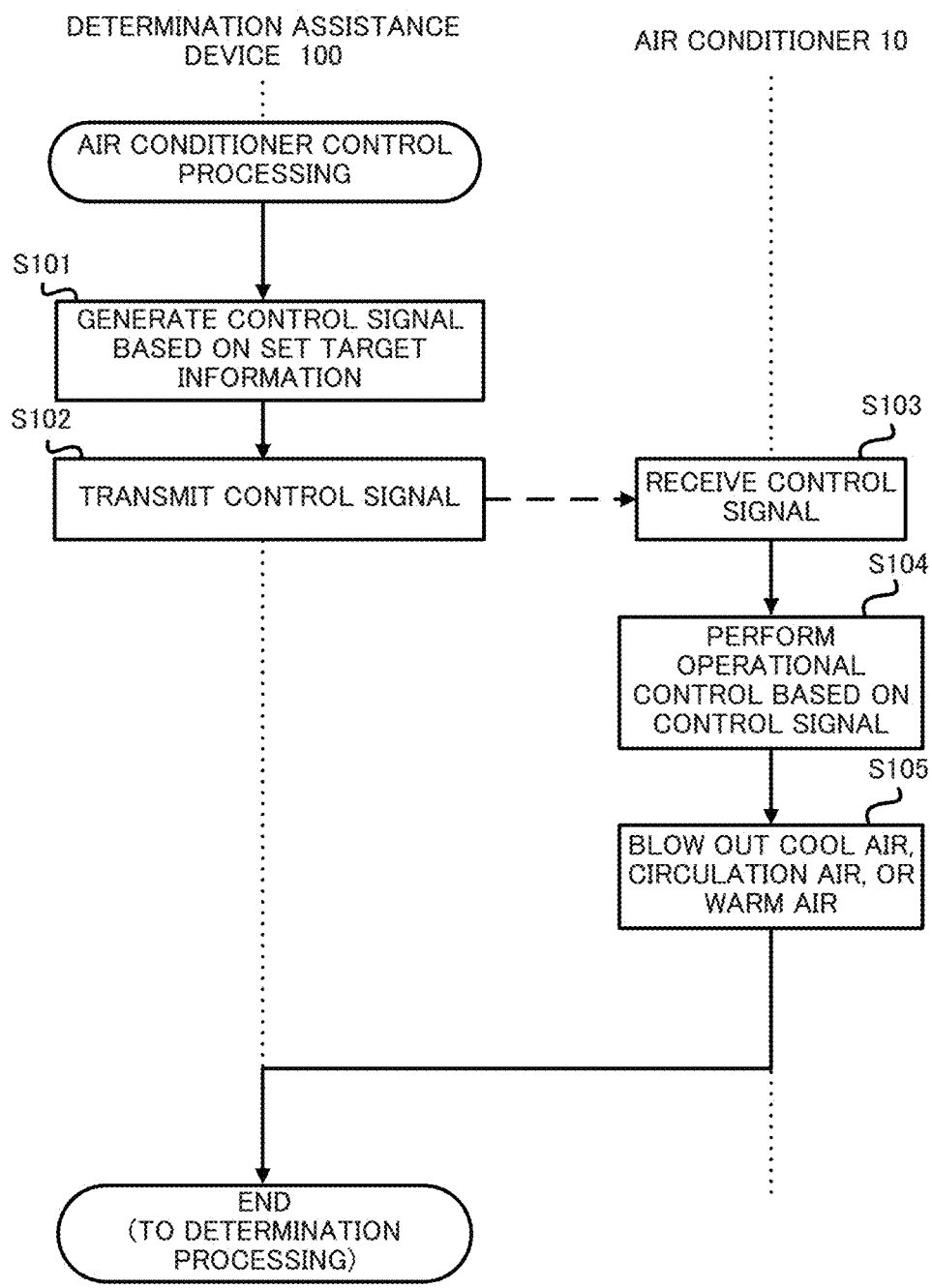
FIG. 4 is a flowchart illustrating air conditioner control processing by the determination assistance device according to Embodiment 1.

Next, air conditioner control processing by the aforementioned determination assistance device 100 is described with reference to FIG. 4. The determination as to whether or not abnormality is present in the air conditioner 10 is made while the air conditioner 10 is under operation. As such, this processing is for setting the operation state of the air conditioner 10 based on the target information, as preparation prior to determining whether or not abnormality is present in the air conditioner 10.

This processing begins by an instruction to begin processing subsequent to an input of the target information by the user via the inputter 130 of the determination assistance device 100. At such time, the determination assistance device 100 stores the set target information into the storage 160 as the target information 163.

First, the control signal generator 153 of the determination assistance device 100 generates a control signal based on the target information 163 set by the user (step S101).

The controller 150 of the determination assistance device 100 transmits the generated control signal to the air conditioner 10 via the communicator 120 (step S102). The communicator 15 of the air conditioner 10 receives the control signal from the determination assistance device 100 (step S103).

The controller 11 of the air conditioner 10 sets the target information based on the received control signal and performs operational control (step S104). As a result, the cool air, circulation air, or warm air is blown out from the air conditioner 10 into an interior space (step S105). Because after the determination assistance device 100 completes the air conditioner control processing, the air conditioner 10 performs operational control based on the target information, the determination assistance device 10 is enabled to determine the state of the device.

Figure 5:
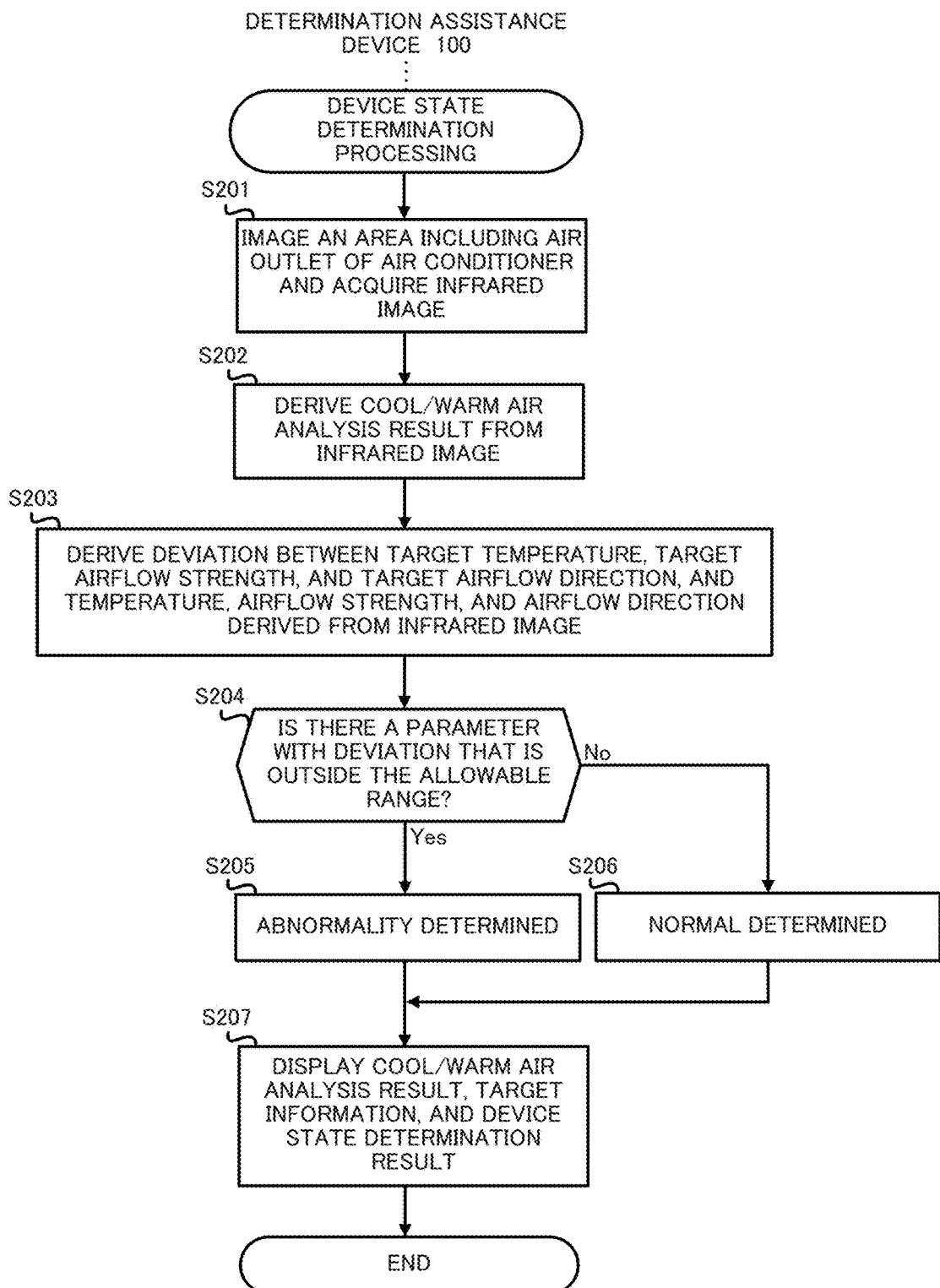
FIG. 5 is a flowchart illustrating device state determination processing by the determination assistance device according to Embodiment 1.

Next, device state determination processing by the aforementioned determination assistance device 100 is described with reference to FIG. 5. This processing starts upon the user pressing the imaging switch on the inputter 130 while directing the infrared image acquirer 110 of the determination assistance device 100 at the area including the air outlet of the air conditioner 10.

First, the infrared image acquirer 110 of the determination assistance device 100 images an area including the air outlet of the air conditioner 10 and acquires an infrared image of a two-dimensional coordinate space based on a distribution of an amount of infrared radiation emitted from the imaged area (step S201). At such time, the display controller 154 of the determination assistance device 100 displays the acquired infrared image on the display 140. The user can confirm whether the imaging is performed properly by viewing the infrared image displayed on the display 140. Also, the user or the controller 150 can use the infrared image to confirm the temperature distribution of the imaged area.

Next, the cool/warm air analyzer 151 of the determination assistance device 100 derives the cool/warm air analysis result from the infrared image acquired by the infrared image acquirer 110 by using the above-described cool/warm air analysis method (step S202). At such time, the determination assistance device 100 stores the cool/warm air analysis result into the storage 160 as the cool/warm air analysis result 161.

Then, the device state determiner 152 of the determination assistance device 100 reads the target temperature, the target airflow strength, and the target airflow direction provided in the target information 163 that is stored in the storage 160 when the previously described air conditioner control processing starts, and derives deviations between the read target temperature, target airflow strength, and target airflow direction and the temperature, airflow strength, and airflow direction derived from the infrared image included in the cool/warm air analysis result 161 (step S203).

The device state determiner 152 of the determination assistance device 100 determines whether there is a parameter (that is, at least one of a temperature, an airflow strength, or an airflow direction) with a derived deviation that is outside the allowable range based on the previously-described criteria (step S204).

As a result, when there is a parameter that is outside the allowable range (YES in step S204), the device state determiner 152 of the determination assistance device 100 determines that the operation state of the air conditioner 10 is "Abnormal" (step S205). In such a case, the device state determiner 152 of the determination assistance device 100 also determines the abnormality type based on the type of the parameter that is outside the allowable range.

On the contrary, when no parameter is outside the allowable range (NO in step S204), the device state determiner 152 of the determination assistance device 100 determines that the operation state of the air conditioner 10 is "Normal" (step S206). In such a case, the device state determiner 152 of the determination assistance device 100 determines the abnormality type to be "None".

The determination assistance device 100 stores the device state determination result, which is the above-described determination result, as the device state determination result 162, into the storage 160. Upon completion of the above, the display controller 154 of the determination assistance device 100 displays on the display 140 the cool/warm air analysis result 161, the target information 163, and the device state determination result 162 that are stored in the storage 160 (FIG. 3, for example) (step S207).

As described above, the determination assistance device 100 of the present embodiment acquires the infrared image by using the infrared image acquirer 110 to image the area including the air outlet of the air conditioner 10. The display controller 154 of the determination assistance device 100 displays on the display 140 the infrared image acquired by the infrared image acquirer 110. Nowadays, general-purpose communication terminals such as smartphones are often equipped with infrared receiver functionality and infrared camera functionality. Utilizing the configuration of such communication terminals to achieve the aforementioned configuration of the determination assistance device 100 obviates the need to make drastic function modifications. As such, the design restrictions are small.

Moreover, the determination assistance device 100 of the present embodiment determines whether or not abnormality is present in the air conditioner 10 based on the infrared image (specifically, the temperature distribution indicated by the infrared image). Thus, accurate determinations can be made as to whether or not abnormality is present in the air conditioner 10. Moreover, the user can view the determination result displayed on the display 140 to know whether or not abnormality is present in the air conditioner 10. Thus, the determination assistance device 100 of the present embodiment can assist in the making of accurate determinations as to whether or not abnormality is present in the air conditioner 10.

Embodiment 2

Next, a determination assistance device system 1 according to Embodiment 2 is described with reference to the drawings. Components that are in common with those of the determination assistance device 100 described in Embodiment 1 are assigned the same reference numerals. Also, the air conditioner that is subject to determination by the determination assistance system 1 is the air conditioner 10 similarly to Embodiment 1.

Figure 6:
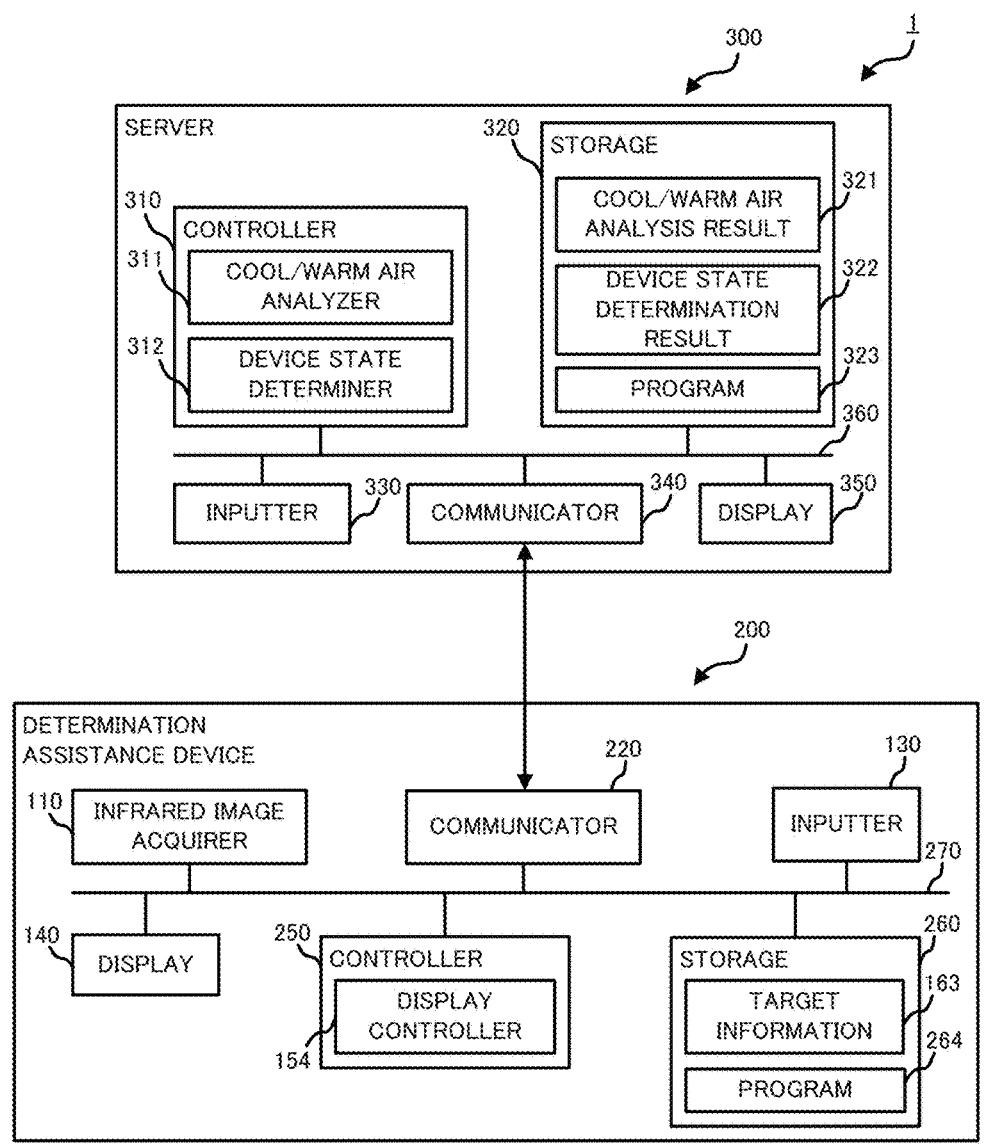
FIG. 6 is a function block diagram illustrating a determination assistance system according to Embodiment 2.

As illustrated in FIG. 6, the determination assistance system 1 includes a determination assistance device 200 that acquires an infrared image and displays a determination result (such as whether or not abnormality is present in the air conditioner 10), and a server 300 that performs cool/warm air analysis and makes the device state determination.

The determination assistance device 200 is, for example, a compact terminal device (smartphone) portable for the user (maintenance worker) and provided with communication functionality. The server 300 is a device that communicates with the determination assistance device 200 and performs the processing of the cool/warm air analysis and the device state determination, and is disposed in a location distant from the maintenance location where the air conditioner is installed.

The determination assistance device 200 includes an infrared image acquirer 110 that acquires an infrared image, a communicator 220 that communicates with another device, an inputter 130 that accepts data inputs, imaging switch operations, and the like performed by user, a display 140 that displays image data and the like, a controller 250 that controls overall operations of the determination assistance 200, and a storage 260 that stores various data, a program, and the like. The components are mutually connected via a bus 270.

The communicator 220 includes the same components as those of the communicator 120 as previously described in Embodiment 1 and communicates with other devices (the server 300 and the air conditioner 10 that is the determination subject) via a wireless local area network (LAN). The communicator 220 functions as communication means.

The controller 250 includes a processor, which may include a central processing unit (CPU), a read only memory (ROM), and/or a random access memory (RAM). The controller 250 also includes the display controller 154 similarly to the controller 150 of Embodiment 1. The controller 250 controls the overall operations of the determination assistance device 200. The display controller 154 functions as display controlling means.

The storage 260 includes a hard disk drive, a readable/writable non-volatile semiconductor memory such as flash memory, and the like. The storage 260 stores, for example, various kinds of data such as transmission/reception data of the communicator 220, the target information 163, and the like and a program 264 for controlling the operation state of each component of the determination assistance device 200.

The server 300 includes a controller 310 that controls the overall operations of the server 300, a storage 320 that stores various kinds of data, a program, and the like, an inputter 330 that accepts data inputs performed by the user (a server administrator), a communicator 340 that performs communication with another device, and a display 350 that displays image data and the like. The components are mutually connected via a bus 360.

The controller 310 includes a processor, which may include a central processing unit (CPU), a read only memory (ROM), and/or a random access memory (RAM). The controller 310 controls the overall operations of the server 300.

The storage 320 includes hard disk drive, a readable/writable non-volatile semiconductor memory such as a flash memory, and the like. The storage 320 stores, for example, various kinds of data such as a cool/warm air analysis result 321, a device state determination result 322, the transmission/reception data of the communicator 340, and the like and a program 323 for controlling the operation state of each component of the determination assistance device 200.

The inputter 330 may be, for example, a keyboard, a mouse, and/or a touch panel. The inputter 330 accepts data inputs and various operations performed by the user (the server administrator).

The communicator 340 includes, for example, a communication antenna, radio frequency (RF) circuit, a baseband (BB) circuit, and/or the like. The communicator 340 communicates with another device (the determination assistance device 200, for example), via a wireless wide area network (WAN).

The display 350, may be, for example, a liquid crystal display (LCD), an electroluminescence (EL) display, a plasma display panel (PDP), or the like. The display 350 displays an image in accordance with the inputted image data.

Next, the function configuration of the controller 310 is described in detail. The controller 310 includes a cool/warm air analyzer 311 that analyzes cool/warm air, and a device state determiner 312 that determines whether or not abnormality is present in the air conditioner 10. The functions of these components are realized by the CPU and the like of the controller 310 executing the program 323 stored in the storage 320.

The cool/warm air analyzer 311 derives cool/warm air temperature, airflow strength, and airflow direction based on the reception data of the communicator 340. This reception data is data of the infrared image received from the determination assistance device 200. Note that the details of the derivation method are the same of those of the method previously described in Embodiment 1. However, the infrared image is not displayed on the display 350, and the determination is made by internal operations based on the data of the infrared image.

The device state determiner 312 compares the temperature, the airflow strength, and the airflow direction of the cool/warm air derived by the cool/warm air analyzer 311 against the target temperature, the target airflow strength, and the target airflow direction provided in the target information received from the determination assistance device 200 by the communicator 340, and derives deviations between those of the cool/warm air analyzer 311 and the target information. The device state determiner 312 determines, based on the derived deviations, whether or not abnormality is present in the air conditioner 10. Note that the details of the determination method are the same as those of the method previously described in Embodiment 1.

Figure 7:
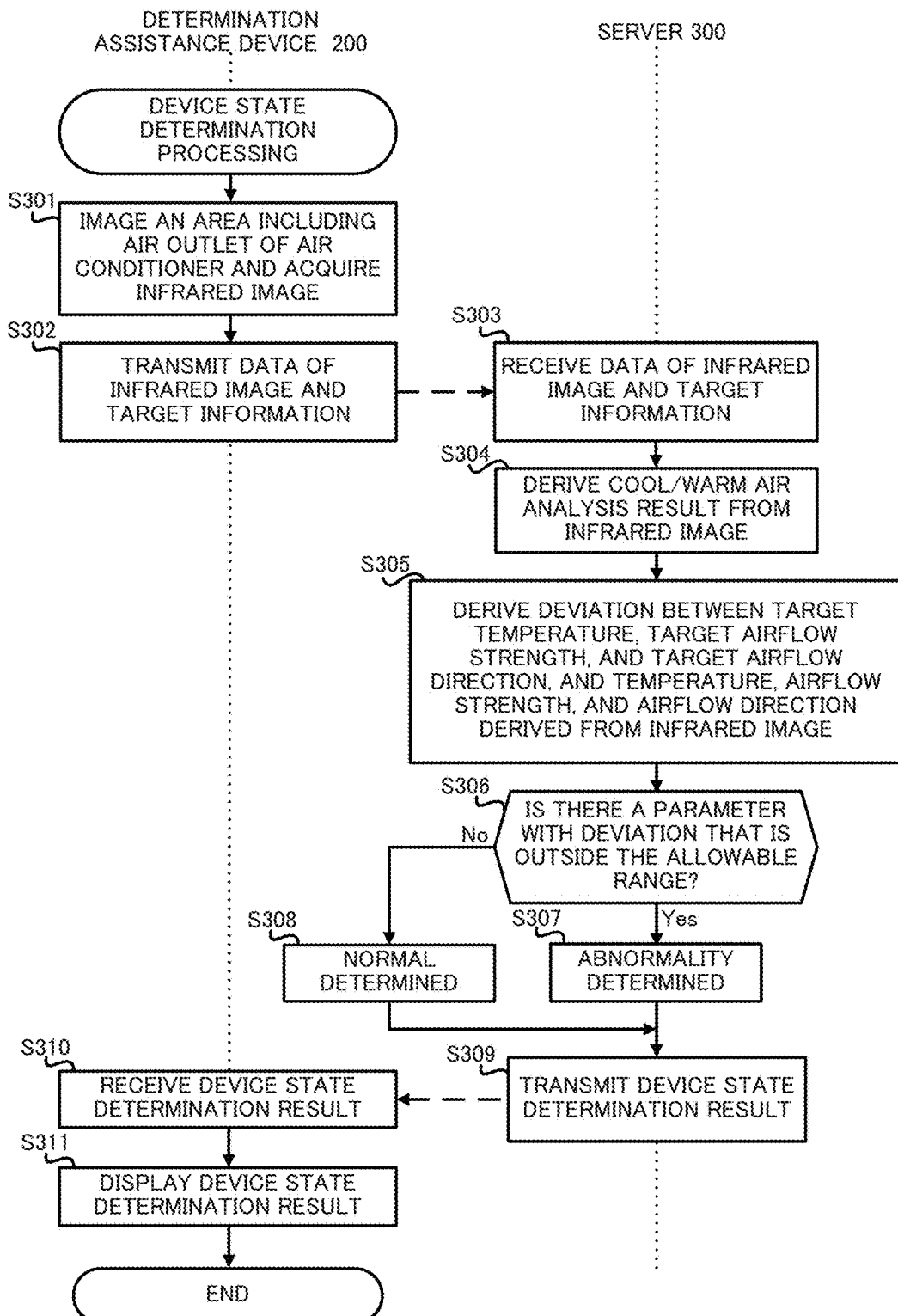
FIG. 7 is a flowchart illustrating device state determination processing by the determination assistance system according to Embodiment 2.

Next, device state determination processing by the aforementioned determination assistance system 1 is described with reference to FIG. 7. Before start of processing, the user directly operates the air conditioner 10 to set the operation state and inputs the set target information in the determination assistance device 200 via the inputter 130, and the set target information is stored in the storage 260 as the target information 163.

This processing starts upon the pressing by the user of the imaging switch on the inputter 130 while the infrared image acquirer 110 of the determination assistance device 200 is directed at the area including the air outlet of the air conditioner 10.

First, the infrared image acquirer 110 of the determination assistance device 200 images an area including the air outlet of the air conditioner 10 and acquires an infrared image of a two-dimensional coordinate space based on a distribution of an amount of infrared radiation emitted from the imaged area (step S301). At such time, the display controller 154 of the determination assistance device 200 displays the acquired infrared image on the display 140. The user can confirm whether the imaging was performed properly by viewing the infrared image displayed on the display 140. Also, the user can use the displayed infrared image to confirm the temperature distribution of the imaged area.

Next, the controller 250 of the determination assistance device 200 transmits the data of the acquired infrared image and the target information to the server 300 via the communicator 220 (step S302). Note that the target information mentioned here is set prior to this processing, and is the target information 163 that is stored in the storage 260.

The communicator 340 of the server 300 receives the data of the infrared image and the target information that are transmitted by the determination assistance device 200 (step S303). The cool/warm air analyzer 311 of the server 300 derives the cool/warm air analysis result from the infrared image by using the above-described cool/warm air analysis method (step S304). At such time, the controller 310 of the server 300 stores the cool/warm air analysis result into the storage 320 as the cool/warm air analysis result 321.

Next, the device state determiner 312 of the server 300 derives deviations between the target temperature, the target airflow strength, and the target airflow direction provided in the received target information and the temperature, the airflow strength, and the airflow direction derived from the infrared image (step S305). The details of the derivation method are as previously described.

The device state determiner 312 of the server 300 determines whether there is a parameter (that is, at least one of a temperature, an airflow strength, or an airflow direction) with a derived deviation that is outside the allowable range based on the previously-described criteria (step S306).

As a result, when there is a parameter that is outside the allowable range (YES in step S306), the device state determiner 312 of the server 300 determines that the operation state of the air conditioner 10 is "Abnormal" (step S307). In such a case, the device state determiner 312 of the server 300 also determines the abnormality type based on the type of the parameter that is outside the allowable range.

On the contrary, when no parameter is outside the allowable range (NO in step S306), the device state determiner 312 of the server 300 determines that the operation state of the air conditioner 10 is "Normal" (step S308). In such a case, the device state determiner 312 of the server 300 determines the abnormality type to be "None".

The controller 310 of the server 300 stores the device state determination result as the device state determination result 322 into the storage 320 and transmits the device state determination result to the determination assistance device 200 via the communicator 340 (step S309). The communicator 220 of the determination assistance device 200 receives the device state determination result transmitted by the server 300 (step S310). The display controller 154 of the determination assistance device 200 displays on the display 140 the received device state determination result (whether or not abnormality is present, and the like) (step S311).

As described above, the determination assistance system 1 of the present embodiment performs the cool/warm air analysis and the device state determination by way of the server 300 instead of by way of the determination assistance device 200. Thus, the configuration of the determination assistance device 200 can be made simple, using only requisite components.

Also, for ease in understanding, only one determination assistance device 200 is described in the present embodiment. However, when the configuration is made such that there are multiple determination assistance devices 200 with which the server 300 communicates, the server 300 is capable of centrally managing, for example, the infrared images and determination results received from the determination assistance devices 200.

The present disclosure is not limited to the aforementioned embodiments, and various changes and modifications can be made thereto. In addition, the aforementioned embodiments and the modifications provided below can be freely combined as appropriate except where explicitly indicated otherwise. Next, the modifications are described.

Modifications

In the above-described embodiments, the determination assistance devices 100 and 200 are compact mobile terminal devices (smartphones) provided with mobile communication functionality for the user (the maintenance worker).

However, the determination assistance devices 100 and 200 may be remote controls of the air conditioner 10. In such a case, the communication between the air conditioner 10 and the determination assistance devices 100 and 200 may be performed using an air-conditioning communication network between the remote controls and the air conditioner 10. The air-conditioning communication network may be wired or wireless. Also, the communication between the air conditioner 10 and the determination assistance devices 100 and 200 may be communication that utilizes infrared radiation.

Also, in the aforementioned Embodiment 1, the communication between the determination assistance device 100 and the air conditioner 10 is performed via the wireless LAN. However, a wired LAN may be used instead of the wireless LAN and communication may be performed via a wide area network (WAN) instead of via the LAN.

In the aforementioned embodiments, the infrared image is a monochrome image as illustrated in FIG. 2, for example. However, the infrared image of the present disclosure is not limited to monochrome images, and may be a color image (thermography). Infrared images are generally assumed to be monochrome images, whereas thermal images (thermography) are generally assumed to be color images, and thus the infrared images and the thermal images may be distinguished from each other. However, thermal images are images in which color processing has been applied to an infrared image to enable a user to visually grasp the image with ease. In other words, the thermal image is also originally an infrared image. As such, in the aforementioned description, the term "infrared image" includes thermal images.

In the aforementioned embodiments, the display 140 may be replaced with, for example, an output terminal, and a display device may be connected to the output terminal so as to display the various images. Alternatively, an outputter that outputs audio output, optical output, and the like may be provided in lieu of the display 140 or the display device that display the various images.

This outputter may be configured so as to play audio or cause a light source such as a light emitting diode (LED) to flash and so on, based on, for example, inputted data. For example, when the controllers 150 and 250 in the aforementioned embodiments cause the outputter to reproduce audio, one of two beeps that are different from each other is sounded, depending on whether the determination result is normal or abnormal. The light source provides a distinguishable indication of LED or the like, for example, that illuminates when the result is normal and flashes when abnormality is present. Thus, the user can discern whether or not abnormality is present.

In the aforementioned embodiments, regarding whether or not there is abnormality present in the air conditioner 10, abnormality is determined even if there is only one parameter indicating abnormality (temperature, airflow strength, airflow direction, and the like) as in FIG. 3, and only the aggregate determination result is displayed as the determination result. However, the present disclosure is not limited to this, and the controllers 150 and 310 may determine whether or not abnormality is present on a per-parameter basis (per measurement item), and may display the results on display 140 of the determination assistance devices 100 and 200. For example, as illustrated in FIG. 8, when the measured temperature is 28 degrees Celsius with respect to the target temperature of 26 degrees Celsius and the measured airflow direction is downwards with respect to the upwards target airflow direction, indication of the abnormality present in the measured temperature and the measured airflow direction may be displayed in the device state determination result.

Figure 8:
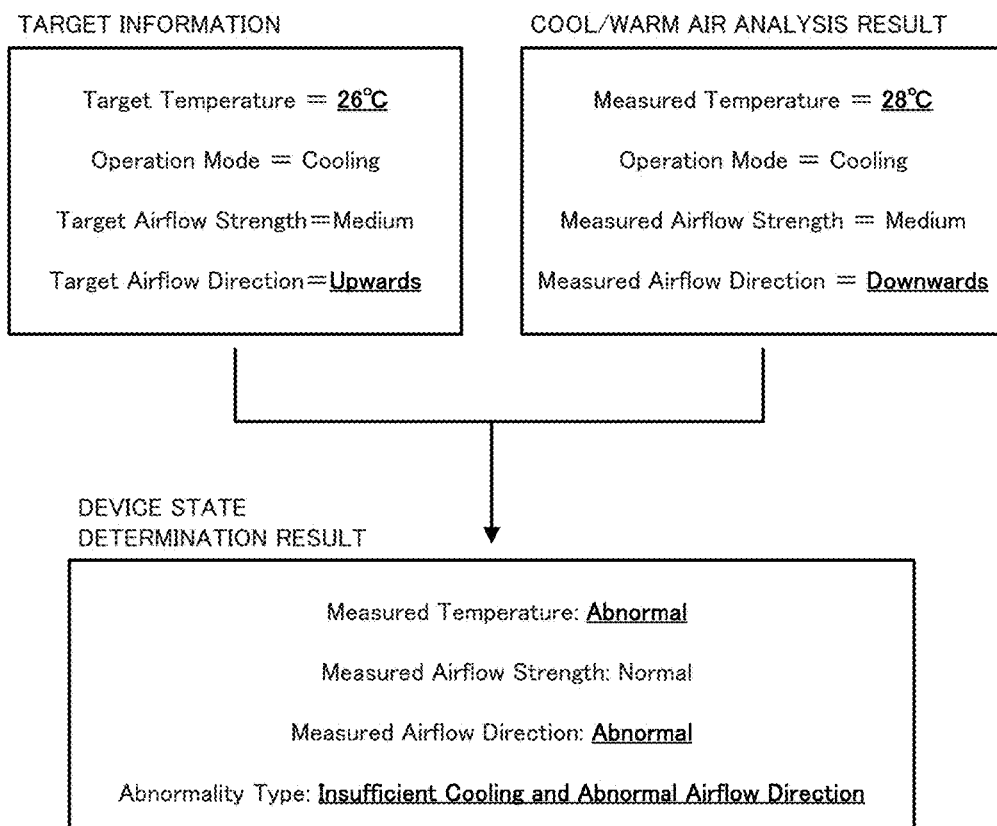
FIG. 8 is a diagram illustrating a modified example of the target information, the cold/warm air analysis result and the device state determination result.

Also, in the aforementioned embodiments, the determination assistance devices 100 and 200, as illustrated in FIGS. 3 and 8, display the determination result on the display 140 regardless of whether the determination result is normal or abnormal. However, the present disclosure is not limited to such a configuration. For example, the determination assistance devices 100 and 200 may be configured such that the display 140 displays or the outputter outputs the determination result only when abnormality is not present or only when abnormality is present in the determination result.

Regarding the cool/warm air analysis and the device state determination in the aforementioned embodiments, a single infrared image (still image) is acquired by the infrared image acquirer 110 as illustrated in FIG. 2, for example, and cool/warm air analysis and the device state determination are performed based on the infrared image.

However, the cool/warm air analysis and the device state determination may be executed based on time transitions (video or slides) of infrared images acquired periodically or continuously. For example, the determination criteria for determining whether or not abnormality is present may be set to whether the deviation between the target temperature and the temperature derived from the infrared images is getting smaller over time. Also, when an operation including airflow directional control (swing) which changes the airflow direction of the air conditioner over time, is underway, the determination criteria for determining whether or not abnormality is present may be set to whether the airflow direction derived from the infrared image is adhering to the airflow directional control. This enables a higher degree of determination accuracy in comparison with making determinations based on a single infrared still-image. Moreover, the number of measurement items (airflow direction control, for example) can be increased in comparison with making determinations based on the single infrared still-image.

In the aforementioned embodiments, the setting of the target information for the air conditioner 10 is performed by data inputting or operation by the user. However, the target information for setting the air conditioner 10 may be stored beforehand in the storage 160 of the determination assistance device 100 and the storage 260 of the determination assistance device 200, and the operation state (test operation mode) of the air conditioner 10 may be automatically set based on the target information by the controller 150 executing the program 164 and by the controller 250 executing the program 264.

In the aforementioned embodiments, the information provided in the control signal is described as being used for selection of the cooling operation. However, the control signal may be configured so as to provide information that is used for selection of an operation mode among not only the cooling operation but also a heating operation, an air-circulation operation, and a stopping-operation.

Also, the target information corresponding to multiple operation states may be set and switched such that the operation mode, the set temperature, or the like is automatically set and switched by the schedule processing of the programs 164 and 264. Automatic switching is performed every time a set duration of time, which is set in the schedule by the user, elapses. In such a case, device state determination for multiple operation states can be performed automatically.

By applying operation programs defining the operation of the determination assistance devices 100 and 200 of the present disclosure to an existing personal computer or information terminal device, the personal computer or the like can be enabled to function as the determination assistance devices 100 and 200 of the present disclosure.

The above programs may be distributed by any method and, for example, may be stored and distributed on a non-transitory computer-readable recording medium such as a compact disk read only memory, (CD-ROM), a digital versatile disc (DVD), and a memory card, or distributed via a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is adoptable with a determination assistance device, a determination assistance method, and a program that are for assisting in the making of accurate determinations as to whether or not abnormality is present in an air conditioner.

REFERENCE SIGNS LIST

1 Determination assistance system
10 Air conditioner
100, 200 Determination assistance device
300 Server
110 Infrared image acquirer
120, 220 Communicator
130 Inputter
140 Display
150, 250, 310 Controller
160, 260 Storage
151, 311 Cool/warm air analyzer
152, 312 Device state determiner
153 Control signal generator
154 Display controller
164, 264, 323 Program

The invention claimed is:

1. A determination assistance device comprising:
a communicator;
at least one memory storing a program; and
at least one processor,
wherein the at least one processor is programmed by the program to:
store target information, the target information being information for setting an operation state of an air conditioner and including target temperature and target airflow strength set in the air conditioner; and
perform determination assistance including to
transmit, via the communicator, to the air conditioner, the target information to cause the air conditioner to perform operational control based on the target information, as preparation to perform a determination whether or not an abnormality is present in the air conditioner;

then acquire, via an infrared image acquirer, an infrared image by imaging an area including an air outlet of the air conditioner;

perform the determination whether or not the abnormality is present in the air conditioner based on at least one of a first difference between temperature of cool/warm air derived from the infrared image and the target temperature included in the stored target information or a second difference between airflow strength of the cool/warm air derived from the infrared image and the target airflow strength included in the stored target information; and cause a display to display the infrared image and whether or not the abnormality is present in the air conditioner.

2. The determination assistance device according to claim 1, wherein the at least one processor is further programmed to cause the communicator to transmit data of the infrared image to another device, and to receive from the other device a determination result made by the other device as to whether or not the abnormality is present in the air conditioner.

3. The determination assistance device according to claim 2, wherein the at least one processor is further programmed to perform the determination whether or not the abnormality is present in the air conditioner based on time transitions of infrared images acquired periodically or continuously.

4. The determination assistance device according to claim 1, wherein the at least one processor is further programmed to perform the determination whether or not the abnormality is present in the air conditioner based on time transitions of infrared images acquired periodically or continuously.

5. The determination assistance device according to claim 1, wherein the determination whether or not the abnormality is present is based on whether or not the first difference falls within a first predetermined allowable range and the second difference falls within a second predetermined allowable range.

6. The determination assistance device according to claim 1, wherein the target information is information for setting the operation state of the air conditioner to a test operation state, and the at least one processor is further programmed to:
when the target information is information to cause the air conditioner to be in a cooling operation as a test operation,
detect from the infrared image as an air outlet area corresponding to the air outlet an image area indicating lowest temperature from among temperatures indicated by the acquired infrared image, and
detect the lowest temperature as temperature of cool air blown from the air outlet, and
when the target information is information to cause the air conditioner to be in a heating operation as the test operation,
detect from the infrared image as the air outlet area an image area indicating highest temperature from among the temperatures indicated by the acquired infrared image, and
detect the highest temperature as temperature of warm air blown from the air outlet,
to derive the temperature of the cool/warm air from the infrared image.

7. The determination assistance device according to claim 6, wherein the at least one processor is further programmed to:
detect from the infrared image a temperature gradient starting from the air outlet area and changing from starting temperature that is the temperature indicated by the air outlet area to temperature higher or lower than the starting temperature, and
detect airflow strength of the cool air or airflow strength of the warm air based on a length of the detected temperature gradient within the infrared image
to derive the airflow strength of the cool/warm air from the infrared image.

8. The determination assistance device according to claim 6, wherein the at least one processor is further programmed to:
detect from the infrared image a temperature gradient starting from the air outlet area and changing from starting temperature that is the temperature indicated by the air outlet area to temperature higher or lower than the starting temperature, and
detect an airflow direction of the cool air or an airflow direction of the warm air based on a direction of the detected temperature gradient within the infrared image,
to derive an airflow direction of the cool/warm air from the infrared image.

9. The determination assistance device according to claim 8, wherein the target information is information to cause the air conditioner to perform airflow directional control to change over time the airflow direction of the cool/warm air blown from the air outlet of the air conditioner, and the at least one processor is further programmed to:
acquire infrared images periodically or continuously, and
perform the determination whether or not the abnormality is present in the air conditioner based on time transitions of difference between the airflow direction of the cool/warm air derived from the infrared images acquired periodically or continuously and the airflow direction of the cool/warm air changed by the airflow directional control.

10. The determination assistance device according to claim 9, wherein the at least one processor is further programmed to perform the determination whether or not the abnormality is present in the air conditioner based on whether the airflow direction of the cool/warm air derived from the infrared images is adhering to the airflow direction of the cool/warm air changed by the airflow directional control.

11. The determination assistance device according to claim 6, wherein the at least one processor is further programmed to:
acquire infrared images periodically or continuously, and
perform the determination whether or not the abnormality is present in the air conditioner based on time transitions of difference between the temperature of the cool/warm air derived from the infrared images acquired periodically or continuously and the target temperature included in the target information.

12. The determination assistance device according to claim 11, wherein the at least one processor is further programmed to perform the determination whether or not the abnormality is present in the air conditioner based on whether the difference between the temperature of the cool/warm air derived from the infrared images and the target temperature gradually gets smaller over time.

13. A determination assistance method comprising:
storing target information, the target information being information for setting an operation state of an air conditioner and including target temperature and target airflow strength set in the air conditioner; and
performing determination assistance including
transmitting to the air conditioner the target information to cause the air conditioner to perform operational control based on the target information, as preparation for performing a determination whether or not an abnormality is present in the air conditioner;
then imaging an area including an air outlet of the air conditioner;
acquiring an infrared image of the area;
deriving temperature and airflow strength of cool/warm air blown from the air outlet from the infrared image;
performing the determination whether or not the abnormality is present in the air conditioner based on at least one of a first difference between the temperature of the cool/warm air derived from the infrared image and the target temperature included in the stored target information or a second difference between the airflow strength of the cool/warm air derived from the infrared image and the target airflow strength included in the stored target information; and
causing a display to display the acquired infrared image and whether or not the abnormality is present in the air conditioner.

14. The determination assistance method according to claim 13, wherein the determination whether or not the abnormality is present is based on whether or not the first difference falls within a first predetermined allowable range and the second difference falls within a second predetermined allowable range.

15. A non-transitory computer-readable recording medium storing a program for causing a computer to:
store target information, the target information being information for setting an operation state of an air conditioner and including target temperature and target airflow strength set in the air conditioner; and
perform determination assistance including to
transmit via a communicator to the air conditioner the target information to cause the air conditioner to perform operational control based on the target information, as preparation to perform a determination whether or not an abnormality is present in the air conditioner;
then acquire an infrared image of an area including an air outlet of the air conditioner;
perform the determination whether or not the abnormality is present in the air conditioner based on at least one of a first difference between temperature of cool/warm air derived from the infrared image and the target temperature included in the stored target information or a second difference between airflow strength of the cool/warm air derived from the infrared image and the target airflow strength included in the stored target information; and
cause a display to display the acquired infrared image and whether or not the abnormality is present in the air conditioner.

16. The non-transitory computer-readable recording medium according to claim 15, wherein the determination whether or not the abnormality is present is based on whether or not the first difference falls within a first predetermined allowable range and the second difference falls within a second predetermined allowable range.

* * * * *